Figures 1, 2, 3:
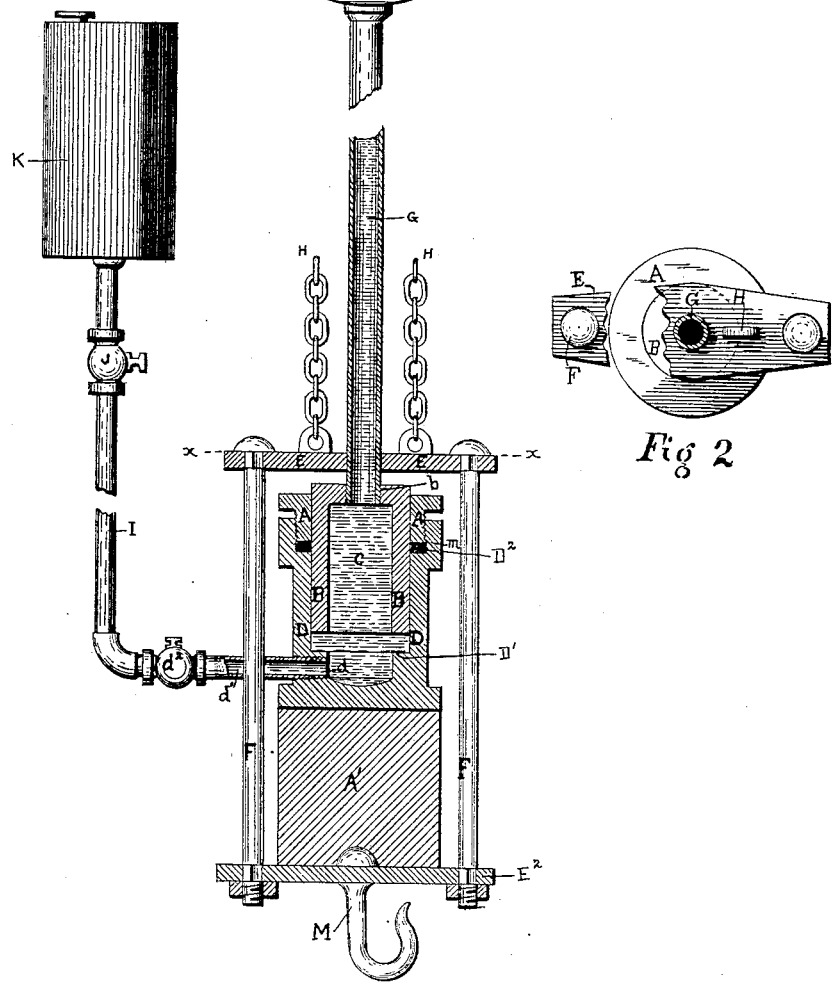

(No Model.)

H. A. LEWIS.
HYDROSTATIC INDICATOR FOR WEIGHING SCALES.

No. 397,464. Patented Feb. 5, 1889.

Witnesses,
Edwin L. Bradford
Frank Dorian

Inventor,
Henry A. Lewis
By his Attorney in fact
Chas. E. Barber

UNITED STATES PATENT OFFICE.

HENRY A. LEWIS, OF FORT WORTH, TEXAS.

HYDROSTATIC INDICATOR FOR WEIGHING-SCALES.

SPECIFICATION forming part of Letters Patent No. 397,464, dated February 5, 1889.

Application filed October 8, 1887. Serial No. 251,808. (No model.)

*To all whom it may concern:*

Be it known that I, HENRY A. LEWIS, a citizen of the United States, formerly of Henrietta, in the county of Clay and State of Texas, but now residing at Fort Worth, in the same State, have invented certain new and useful Improvements in Hydrostatic Indicators for Scales, of which the following is so full, clear, and exact a description as will enable others skilled in the art to which my invention appertains to make and use the same, reference being had to the accompanying drawings, in which—

Figure 1 is a longitudinal vertical section of my scales, showing the registering-dial and part of feed-pipe in front view. Fig. 2 is a view of my scales vertically projected onto a horizontal plane cutting them anywhere between the bearing-plate and the registering-dial. Fig. 3 is a front view of the feed-reservoir.

In the drawings the same letters indicate corresponding parts in all the views.

The object of my invention is to provide a hydrostatic scale in which the column of fluid shall not be the standard of weight, thus getting rid of the otherwise inevitable sources of error present in the slight inequalities of bore in the stand-pipe.

Another object of my invention is to provide a hydrostatic scale in which the action shall be so rapid, and withal so exact, as to enable any man who can read a dial to take the weights of loaded stock-cars while in motion.

Another object of my invention is to construct and provide a hydrostatic scale which shall be compact and light and yet capable of registering the weights of heavy loads.

In the following specification I shall confine myself to the description of those parts which are essential to those parts of the device which are essentially new in my device.

In Fig. 1, A' is a supporting platform or beam, upon which is mounted the hollow cylinder D. Near the bottom of this cylinder is a screw-threaded aperture, $d$, into which is screwed the pipe $d'$, which leads to the reservoir K. This reservoir contains a store of the fluid used in the scales. What this fluid is not material; but it should be some fluid not frozen at ordinary degrees of winter cold, and should be non-viscid. Upon the pipe $d'$ are situated two valves, J and $d^2$, the former being provided with a stop-cock and the latter being automatic, and also capable of being opened and closed by means of a stop-cock.

A little above the entrance of the pipe $d$ into the cylinder the bore of the cylinder is increased and a shoulder, D', is formed. This shoulder may extend entirely around the inner circumference of the cylinder or only partly around it. Closely fitting the outer hollow cylinder, D, is the inner hollow cylinder, B. This hollow cylinder is closed at the top, save for a screw-threaded aperture, $b$, into which the vertical stand-pipe is screwed, as shown at G. The outer cylinder is again widened in bore by the addition of the ring $m$, and the consequent formation of the continuous shoulder $D^2$, which serves as a seat for the flanged ring A, which screws into the inside of the ring $m$ and serves to hold packing in place against said seat, as shown in the figure at $D^3$.

Surrounding the stand-pipe G, and extending across the top of the main cylinder D, is the bearing-bar E. Two stout bars, F, extend downward past the main cylinder and are attached, underneath the beam A' and separate from it, to the under bar, $E^2$. This under bar extends across the bottom of the supporting-beam A', and is provided with a hook, M, on its under side, to which the lever-train of the scales is connected. This lever-train may belong to any system, as it forms no part of my device. The manner in which the weight of the car is transmitted to the hook M is immaterial, as my invention relates to the means of registering the weight so transmitted. The two chains shown at H are intended for the purpose of releasing the scales from the weight instantaneously at will, and, being common to many kind of scales, are immaterial to my device in itself.

The operation of my scales will then be as follows: The reservoir K being placed above the line of the registering-dial L, upon opening the stop-cock J the liquid will flow down into the cylinder, stand-pipe, and dial, and will, doubtless, at first fill these passages so full as to make the needle or hand on the dial stand a little off of the zero-point; but by pressing upon the bearing-bar E a sufficient quantity of fluid may be forced back into the reservoir to bring the needle exactly to the zero-point again. This once accomplished, any motion of the cylinder B downward in the cylinder D will only serve to force the liquid up into the registering-dial L, which may be any one of the many forms of spring-dial on the market. The liquid can take only this direction, as the automatic check-valve $d^2$ is so constructed as to permit the passage of fluids down from the reservoir only when the stop-cock shown in the figure is turned to permit the reflux of the fluid up into the reservoir. The weight then having been transmitted through the system of levers to the hook M in such a way as to bear down upon said hook, the bar $E^2$ will be depressed, and by means of the side bars, F, this downward motion will be transmitted to the bearing-bar E, which is thus made to press down upon the top surface of the inverted closed cylinder B, forcing it down into the cylinder D, and forcing the contained fluid up into the registering-dial L, through the stand-pipe G, and thus registering the weight upon said dial. The cylinder B being bored out, as seen at C, it is capable of containing a considerable quantity of fluid, and hence of supplying a registering apparatus of very large capacity, such as is necessary in the weighing of loaded stock-cars.

Having now described the objects, uses, and advantages of my invention, what I believe to be new, and desire to secure by Letters Patent, and what I therefore claim, is—

1. In a hydrostatic indicator for scales, a hollow inner cylinder, and a second outer cylinder, within which the inner cylinder slides, said inner cylinder being provided with a vertical stand-pipe directly over it, in combination with a registering-dial attached to the top of the stand-pipe, all constructed to operate substantially as and for the purposes specified.

2. In a hydrostatic indicator for scales, a hollow inner cylinder, and a second outer cylinder, within which the inner cylinder slides, a stand-pipe attached to said inner cylinder, and a registering-dial, in combination with a bearing-bar, side rods, and under bar, forming a frame bearing upon the top of said inner cylinder, all constructed to operate substantially as and for the purposes specified.

3. In a hydrostatic indicator for scales, a reservoir, an outer cylinder, a hollow inner cylinder, an attached stand-pipe, and registering-dial, said inner cylinder being surrounded by and sliding within said outer cylinder, said outer cylinder being provided with an attached inlet-pipe communicating with said reservoir, said pipe being provided with two valves, in combination with a bearing-bar, side rods, and under bar, forming a frame bearing upon the inner cylinder, substantially as described.

In testimony that I claim the above as my invention I hereunto set my hand, in the presence of two witnesses, this 8th day of October, 1887.

HENRY A. LEWIS.

Witnesses:
CHAS. E. BARBEN,
FRANK DORIAN.